United States Patent [19]

Noguchi et al.

[11] Patent Number: 5,117,488
[45] Date of Patent: May 26, 1992

[54] MICROPROGRAM CONTROLLED MICROPROCESSOR HAVING A SELECTIVELY EXPANDABLE INSTRUCTION CODE LENGTH INCLUDING INDEPENDENT DESCRIPTION OF OPERAND ADDRESSING AND A TYPE OF OPERATION FOR AN OPERAND BY SINGLE INSTRUCTION IN A COMMON CODING SCHEME

[75] Inventors: Kouki Noguchi, Kokubunji; Fumio Tsuchiya, Kodaira; Takashi Tsukamoto, Kodaira; Shigeki Masumura, Kodaira; Hideo Nakamura, Tokyo; Shiro Baba, Tokorozawa; Yoshimune Hagiwara, Hachioji, all of Japan

[73] Assignees: Hitachi, Ltd.; Hitachi Microcomputer Engineering Ltd.; VLSI Engineering Corporation, Tokyo, Japan

[21] Appl. No.: 265,539

[22] Filed: Nov. 1, 1988

[30] Foreign Application Priority Data
Nov. 4, 1987 [JP] Japan .................. 62-277410

[51] Int. Cl.⁵ .................. G06F 9/22; G06F 9/26; G06F 9/30; G06F 9/34

[52] U.S. Cl. .................. 395/375; 364/255.8; 364/259.9; 364/260.6; 364/262.4; 364/262.8; 364/262.9; 364/262.81; 364/263.1; 364/261.1; 364/261.2; 364/DIG. 1

[58] Field of Search ... 364/200 MS File, 900 MS File; 340/146.1

[56] References Cited

U.S. PATENT DOCUMENTS

| | | | |
|---|---|---|---|
| 4,087,857 | 5/1978 | Joyce et al. | 364/200 |
| 4,162,480 | 7/1979 | Berlekamp | 340/146.1 |
| 4,197,578 | 4/1980 | Wada et al. | 364/200 |
| 4,432,052 | 2/1984 | McDonough et al. | 364/200 |
| 4,446,517 | 5/1984 | Katsura et al. | 364/200 |
| 4,797,808 | 1/1989 | Bellay et al. | 364/200 |
| 4,807,113 | 2/1989 | Matsumoto et al. | 364/200 |

*Primary Examiner*—Thomas C. Lee
*Assistant Examiner*—Daniel Pan
*Attorney, Agent, or Firm*—Fay, Sharpe, Beall, Fagan, Minnich & McKee

[57] ABSTRACT

In a microprocessor, a minimum instruction code length is set to a predetermined number of bits (e.g. one byte) length. One feature of the invention is that an instruction set which can selectively expand the instruction code length at a unit of the predetermined number of bits is used. Another feature is that an operand addressing mode and a type of operation for an operand are designated by separate predetermined number of code bits which are coded in a common coding scheme so that an instruction decoder is shared by those codes.

4 Claims, 7 Drawing Sheets

FIG. 2
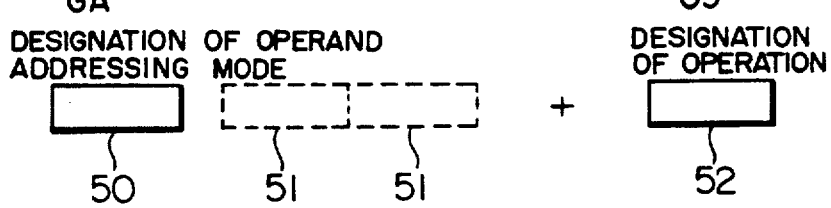
FIG. 3
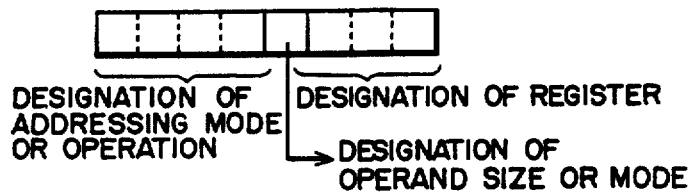
FIG. 4
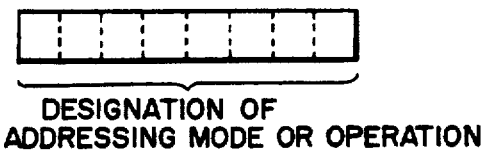
FIG. 5
| HIGH ORDER 4 BITS \ LOW ORDER 4 BITS | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | • | | | | | | | | | | | | | | | |
| 1 | | | | | 53 | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | 54 | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

FIG. 6

| HI\LO | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NOP | SCB/F | LDM | PJSR | #IMM8 | @ABS8.B | SCB/NE | SCB/ER | TRAPA | TRAP/NE | RTE | | #IMM16 | @ABS8.W | BSR disp8 | UNLK |
| 1 | JMP | | STM | PJMP | RTD #IMM8 | @ABS16.B | | LINK #IMM8 | JSR | RTS | SLEEP | | RTD #IMM16 | @ABS16.W | BSR disp16 | LINK #IMM16 |
| 2 | | | | | | | Bcc | | disp8 | | | | | | | |
| 3 | | | | | | | Bcc | | disp16 | | | | | | | |
| 4 | | | CMP.B | | #IMM8, Rn | | | | | | CMP.W | | #IMM16, Rn | | | |
| 5 | | | MOV.B | | #IMM8, Rn | | | | | | MOV.W | | #IMM16, Rn | | | |
| 6 | | | MOV.B | | @ABS8, Rn | | | | | | MOV.W | | @ABS8, Rn | | | |
| 7 | | | MOV.B | | Rn, @ABS8 | | | | | | MOV.W | | Rn, @ABS8 | | | |
| 8 | | | MOV.B | | @(disp8, R6), Rn | | | | | | MOV.W | | @(disp8, R6), Rn | | | |
| 9 | | | MOV.B | | Rn, @(disp8, R6) | | | | | | MOV.W | | Rn, @(disp8, R6) | | | |
| A | | | Rn | | (byte) | | | | | | Rn | | (word) | | | |
| B | | | @-Rn | | (byte) | | | | | | @-Rn | | (word) | | | |
| C | | | @Rn+ | | (byte) | | | | | | @Rn+ | | (word) | | | |
| D | | | @Rn | | (byte) | | | | | | @Rn | | (word) | | | |
| E | | | @(disp8, Rn) | | (byte) | | | | | | @(disp8, Rn) | | (word) | | | |
| F | | | @(disp16, Rn) | | (byte) | | | | | | @(disp16, Rn) | | (word) | | | |

FIG. 8

| HI\LO | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | SWAP | EXTS | EXTU | CLR | NEG | NOT | TST | TAS | ADDQ #1 | ADDQ #2 | SHLL | SHLR | ROTL | ROTR | ROTXL | ROTXR |
|   |      |      |      |      |      |      |      |      | ADDQ #-1 | ADDQ #-2 |      |      |      |      |      |      |
| 1 |   |   |   | ADD |   |   |   |   |   |   |   | ADDS |   |   |   |   |
| 2 |   |   |   | SUB |   |   |   |   |   |   |   | SUBS |   |   |   |   |
| 3 |   |   |   | OR |   |   |   |   |   |   |   |   |   |   |   |   |
| 4 |   |   |   | AND |   |   |   |   |   |   |   | BSET (dynamic) |   |   |   |   |
| 5 |   |   |   | XOR |   |   |   |   |   |   |   | BCLR (dynamic) |   |   |   |   |
| 6 |   |   |   | CMP |   |   |   |   |   |   |   | BNOT (dynamic) |   |   |   |   |
| 7 |   |   |   | MOV |   |   |   |   |   |   |   | BTST (dynamic) |   |   |   |   |
| 8 |   |   |   | XCH |   |   |   |   |   |   |   | LDC |   |   |   |   |
| 9 |   |   |   | ADDX |   |   |   |   |   |   |   | STC |   |   |   |   |
| A |   |   |   |      |   |   |   |   |   |   |   | MULXU |   |   |   |   |
| B |   |   |   | SUBX |   |   |   |   |   |   |   | DIVXU |   |   |   |   |
| C |   |   |   |      |   |   |   | BSET (static) |   |   |   |   |   |   |   |   |
| D |   |   |   |      |   |   |   | BCLR (static) |   |   |   |   |   |   |   |   |
| E |   |   |   |      |   |   |   | BNOT (static) |   |   |   |   |   |   |   |   |
| F |   |   |   |      |   |   |   | BTST (static) |   |   |   |   |   |   |   |   |

FIG. 9
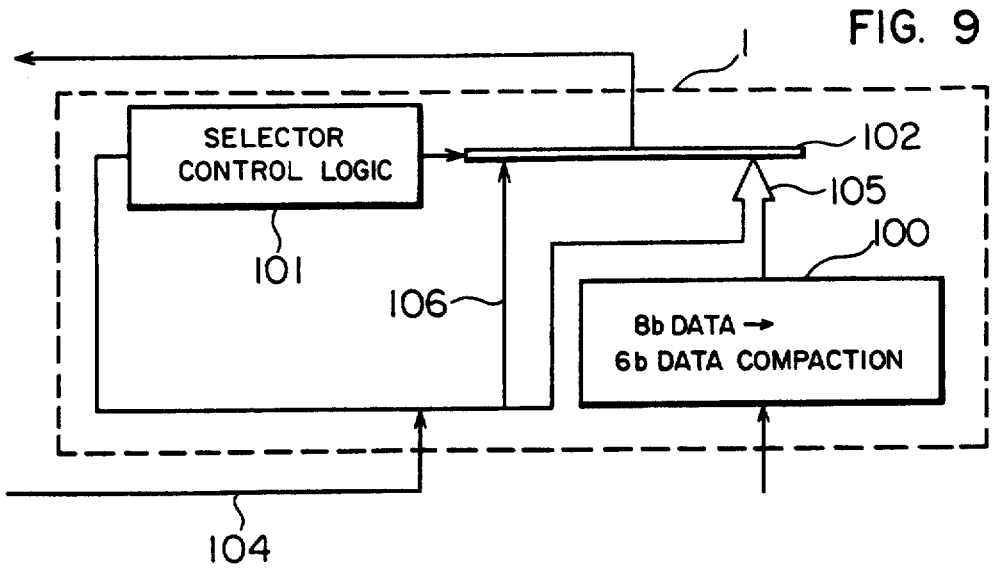
FIG. 10
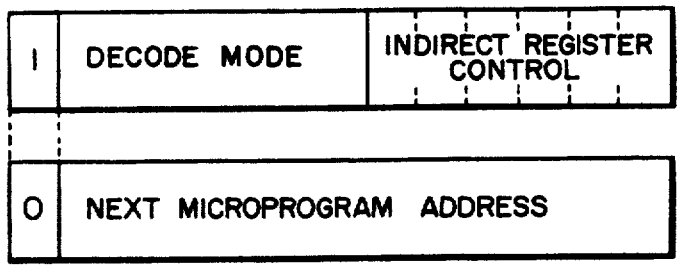
FIG. 11
| | \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| | | | | | | | LOW ORDER 4 BITS | | | | | | | | | | |
| HIGH ORDER 4 BITS | 0 | | | | | | | A D D | | | | | | | | | |
| | 1 | | | | | | | A D D | | | | | | | | | |
| | 2 | | | | | | | A D D | | | | | | | | | |
| | 3 | | | | | | | S U B | | | | | | | | | |
| | 4 | | | | | | | $\overline{O}$ R | | | | | | | | | |
| | 5 | | | | | | | A N D | | | | | | | | | |
| | 6 | | | | | | | E $\overline{O}$ R | | | | | | | | | |
| | 7 | | | | | | | A N D | | | | | | | | | |
| | 8 | | | | | | | A D D | | | | | | | | | |
| | 9 | | | | | | | A D D | | | | | | | | | |
| | A | | | | | | | A D D X | | | | | | | | | |
| | B | | | | | | | S U B X | | | | | | | | | |
| | C | | | | | | | $\overline{O}$ R | | | | | | | | | |
| | D | | | | | | | A N D | | | | | | | | | |
| | E | | | | | | | E $\overline{O}$ B | | | | | | | | | |
| | F | | | | | | | A N D | | | | | | | | | |

MICROPROGRAM CONTROLLED MICROPROCESSOR HAVING A SELECTIVELY EXPANDABLE INSTRUCTION CODE LENGTH INCLUDING INDEPENDENT DESCRIPTION OF OPERAND ADDRESSING AND A TYPE OF OPERATION FOR AN OPERAND BY SINGLE INSTRUCTION IN A COMMON CODING SCHEME

BACKGROUND OF THE INVENTION

The present invention relates to a microprocessor, and more particularly to instruction encoding and an internal control logic structure suitable for reducing the size and improving the performance of an LSI microprocessor.

In a conventional 8-bit microprocessor instruction code, an instruction set primarily for use in an accumulator operation is based on a one-byte instruction. An example of such an instruction set is that used in an 8-bit microprocessor HD 6303X (Hitachi). In a 16-bit microprocessor, general purpose register and an operand address (effective address EA) operation mode have been introduced. As a result, code length for one instruction is more than one byte. An example of such an instruction set is one used in the 16-bit microprocessor 8086 (Intel).

In order to efficiently execute compiling in a high level language, an operation executed by one instruction and generation of an operand address may be independently designated. Namely, as a function of one instruction, the designation of operation and the designation of operand addressing mode are independently effected. This is called orthogonalization of the operation and the operand addressing, and an instruction having such a function is called an orthogonal instruction. An example of such an instruction is one used in the 16-bit microprocessor HD 68000 (Hitachi). Thus, by independently designating the operation and the operand addressing mode, the operand addressing mode can be set for each operation. In this method, however, the code length of one instruction is long. For example, in the instruction set for HD 68000, a minimum instruction code length is of 2-byte length and the instruction code length is thus expanded by a byte unit.

A microprocessor structuring method of a microprogramming system of JP-A-56-108149 discloses a microprocessor structuring method for an instruction which puts a weight on the orthogonality of the operation and the operand addressing mode. In the disclosed structuring method, an entire code which designates the operand and the operand addressing mode is decoded to generate start addresses of a plurality of microprograms such as operation execution microprogram and operand addressing microprogram. In order to execute one instruction, subroutines of the microprograms are sequentially started by those start addresses. Since the operation and the operand addressing mode are independently designated in one instruction, the subroutine method is effective in reducing the volume of the microprograms.

In the above prior art methods, the minimum code length of the instruction is long and no attention is paid to the logical scale of the instruction decoder for decoding the entire long instruction code. As a result, the code efficiency (a reciprocal of the total instruction code length actually used) of the dynamic instruction code in the execution of the program is lowered and the scale of the instruction decoder expands.

SUMMARY OF THE INVENTION

It is an object of the present invention to provide a microprocessor which improves a code efficiency in the execution of the program, reduces the circuit scale of the instruction decoder and has a comparable performance to a microprocessor in which the operation and the operand addressing mode are orthogonal.

The above object is achieved by a microprocessor which has an instruction set in which an instruction code length may be expanded at a unit of a predetermined number of bits (e.g. one byte) as a minimum instruction code length, in which the designation of the operand addressing mode and the designation of the operation are effected by independent codes of the predetermined number of bits, and in which the coding scheme of the codes of the predetermined number of bits is uniform so that an instruction decoder can be shared by those codes.

More specifically, the microprocessor has a microprogram control system having an instruction which allows independent designation of the operand addressing mode and the type of operation to the operand in one instruction. The instruction code length is expandable at a unit of a predetermined number of bits (e.g. 8 bits). The first predetermined number of bits (8 bits) of the code in the instruction indicates the operand addressing mode and the second predetermined number of bits (8 bits) of the code in the instruction indicates the type of operation to the operand. The code scheme or code mapping of those predetermined member of bits (8 bits) is uniform. A combinational logic circuit which receives the instruction code of the predetermined number of bits (8 bits) and produces an output signal having a less number of bits than that of the input signal is provided. The microprogram address is generated by the output of the combinational logic circuit and bit information of at least a portion of the microprogram.

By reducing the minimum code length of the instruction code, the code efficiency in the execution of the program is improved. In order to reduce the minimum code length and decode the instruction at the unit of the code length and execute the instruction, it is necessary to completely separate the operand addressing sequence and the operation sequence when the instruction which independently designates the operand addressing mode and the operation is used. This may be attained by providing means for reserving a portion of the instruction code so that it may be referred to in the next execution sequence.

By using the uniform code mapping for the instruction codes of the basic code length used as data for generating the start addresses of the execution sequences, the instruction decoder can be shared. The sequences may be discriminated by the microprogram.

In accordance with the present invention, the instruction mapping of the microprocessor in which the operand addressing mode and the operation are orthogonal is effected at the unit of byte so that the code efficiency is high. Since it is not necessary to provide an instruction decoder for each field of the instruction code, the circuit scale can be reduced. By internally holding a portion of the instruction code, the volume of the microprogram can be reduced and the circuit scale can also be reduced.

BRIEF DESCRIPTION OF THE DRAWINGS

FIG. 2 shows a format of an instruction code,

FIGS. 3 and 4 show bit configurations of the instruction code,

FIG. 5 shows a mapping method of the instruction code,

FIGS. 6, 7 and 8 show mapping of the instruction code,

FIG. 9 shows a block diagram of an instruction decoder logic,

FIG. 10 shows a microprogram format for controlling an instruction decoder,

FIG. 11 shows mapping of indirect operation designation, and

DESCRIPTION OF THE PREFERRED EMBODIMENTS

Figure 1:
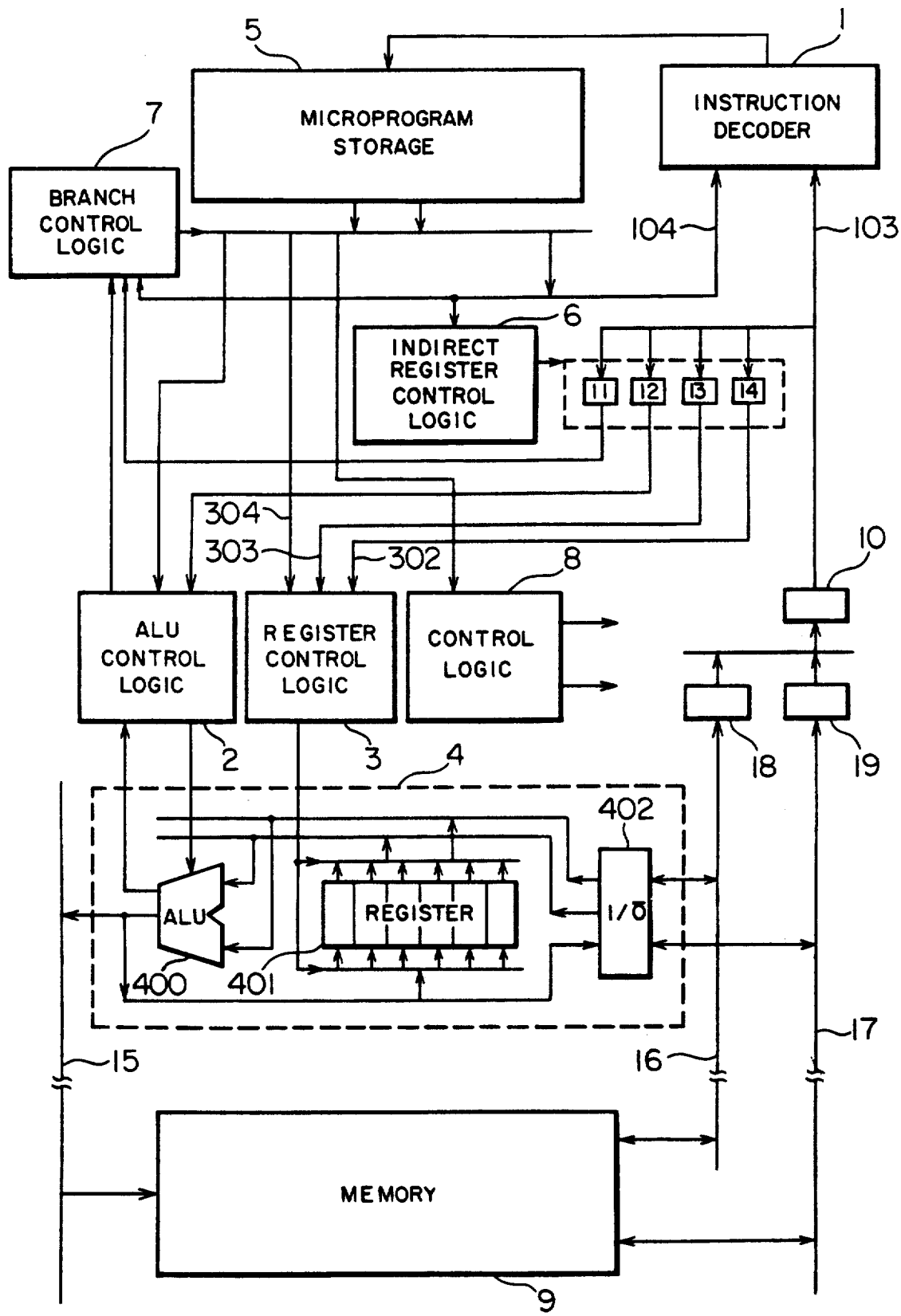
FIG. 1 snows a block diagram of one embodiment of the present invention.

One embodiment of the present invention is now explained with reference to FIG. 1. In the present embodiment, a microprocessor and a portion of a memory are in a one-chip microprocessor. A memory 9 built in the microprocessor is connected to the microprocessor with a 16-bit width including 8-bit data buses 16 and 17. An address is supplied from the microprocessor through an address bus 15, data is read or written through the data buses 16 and 17. When the microprocessor communicates with a device off the chip such as a memory, it uses a higher order data bus H 17 of the internal 16-bit data bus. Of the data supplied through the data bus, the instruction code is sent to an instruction register 10 through prefetch registers 18 and 19 which store the prefetched instruction code. On the other hand, the data to be operated is supplied to an operation circuit 4.

The instruction code is supplied from the instruction register 10 to an instruction decoder 1, and indirect registers 11, 12, 13 and 14 which hold portions of the instruction code during the execution of the instruction. The instruction decoder 1 generates an address of the microprogram and supplies it to a microprogram storage 5, which parallelly outputs a plurality of microprograms corresponding to the input addresses. The microprogram to be executed is designated by a branch control logic 7, which receives a branch condition and an operation result to generate a select signal for the microprogram.

A portion of the selected microprogram is supplied to an ALU control logic 2, a register control logic 3 and a control logic 8 including an input/output control logic and an instruction prefetch circuit, and they generate internal control signals. The ALU control logic 2 generates a control signal for designating an operation to be executed by an ALU 400 which executes an arithmetic operation in the operation circuit 4, and checks a zero flag and an overflow flag supplied from the ALU 400 and supplies branch information to the branch control logic 7. The register control logic 3 generates an operation control signal for registers 401 in the operation circuit 4. The operation circuit 4 operates the data designated by the instruction code in accordance with the microprogram.

FIG. 2 shows an example of format of an instruction code set in the instruction register through the data buses 16 and 17. The instruction format shown is one for the instruction in which the operand addressing mode and the operation are orthogonal. The operand addressing mode is designated by the first one byte 50 of the instruction code. Data such as a displacement used in the operation is added as an expansion field 51 at the unit of one byte. The operation is designated by the last one byte 52. The one-byte instruction code which designates the operand addressing mode and the one-byte instruction code which designates the operation have a common format. The formats are shown in FIGS. 3 and 4. In the instruction code having the format of FIG. 3, the first four bits designate the operand addressing mode or the operation. The next one bit is used as a portion of designation of an operand size or the operation. The last three bits designate the register number of one of eight general purpose registers 401. The instruction code having the format of FIG. 4 is used when there is no register designation. Eight bits are used to designate the operand addressing mode or the operation.

The 8-bit instruction codes shown in FIGS. 3 and 4 are mapped into a code scheme shown in FIG. 5, in which an ordinate represents higher order 4 bits of the 8-bit code in hexadecimal notation, and an abscissa represents lower order 4 bits in hexadecimal notation. For example, an instruction code mapped at 53 is "0 0 0 1 0 1 0 0" in binary notation ("14" in hexadecimal notation). An instruction code mapped at 54 is 1 0 1 1 0 * * * (* being 0 or 1) in binary notation. The instruction code mapped at 55 is one having the instruction format of FIG. 4, and the instruction code mapped at 56 is one having the instruction format of FIG. 3.

As described above, the 8-bit instruction code which designates the operand addressing mode and the 8-bit instruction code which designates the operation are mapped in the code scheme shown in FIG. 5 but they are completely different code maps. The 8-bit instruction code which designates the operation may include the same one as the 8-bit instruction code which designates the operand addressing mode. The code maps of the instruction codes are shown in FIGS. 6, 7 and 8.

FIG. 6 shows an 8-bit instruction code map which designates the operand addressing mode. For example, the instruction code having "1 1 1 0 0 * * *" in binary notation (higher order four bits are E in hexadecimal notation) is shown as ⓞ a (disp 8. Rn) (byte). It means that data on the memory at an address equal to a sum of the content of the register designated by the three bits "* * *" and the eight bits of the expansion field (51 in FIG. 2) following to the 8-bit instruction code (it is called a displacement) is used for the operation. The addressing method shown in FIG. 6 is a standard one used in microprocessor manuals. In the code map, instructions which do not need operands, for example, a conditional branch instruction (Bcc having "2" or "3" in hexadecimal notation at high order 4 bits) are also mapped. In the instruction format shown in FIG. 2 in which the designation of the addressing mode and the designation of the operation are orthogonal, the instruction code length is long. Thus, a compare operation (COMP having "4" in hexadecimal notation in high order four bits) which is frequently used uses a special short form of instruction code which can designate the addressing mode and the operation simultaneously by only the 8-bit length instruction code, as is done in the instruction set of the conventional 8-bit microprocessor.

Figure 7:
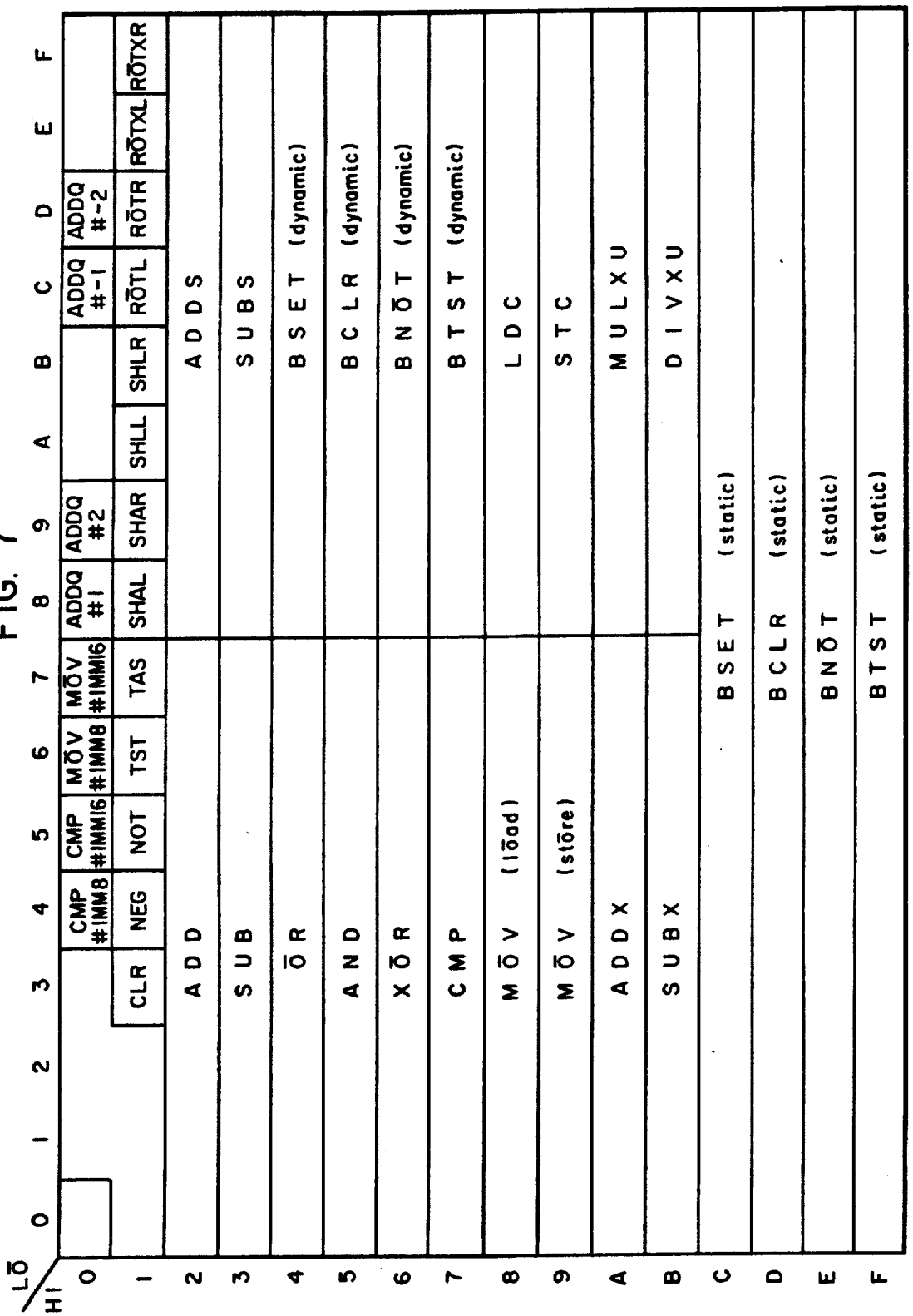

FIGS. 7 and 8 show operation codes which designate the operation. The instruction which is used only with the operand indicated by the instruction code of FIG. 6, for example, a constant add instruction (08, 09, 0C and 0D in the hexadecimal notation) is in the instruction code format shown in FIG. 4. On the other hand, the arithmetic operation which needs operands, for example, addition (ADD having "2" in hexadecimal notation in high order four bit) or subtraction (SUB having "3" in hexadecimal notation in high order four bits) is in the instruction code format shown in FIG. 3.

The instruction decoder 1 generates an address of a microprogram to be next fetched. It may be generated by decoding the instruction code or designating the next address in the microprogram. A configuration of the instruction decoder 1 is shown in FIG. 9 and a format of the microprogram supplied to the instruction decoder 1 is shown in FIG. 10. The 8-bit instruction code 103 is supplied to a logic 100 which compresses the 8-bit data to 6-bit data. The 6-bit data is merged with the decode mode bit shown in FIG. 10 so that it is used as a start address 105 of the subroutine of the microprogram. Where the next microaddress is to be directly designated by the microprogram (106 in FIG. 9), the microprogram format shown in FIG. 10 with the start bit being "0" is designated. If the start bit is "1", the start address 105 of the subroutine is supplied from the instruction decoder 1 to the microprogram storage 5 through the selector 102. A control signal for the selector 102 is generated by the selection control logic 101 by referencing the start bit of the microprogram format shown in FIG. 10.

In order to sequentially execute the instructions in the microprogram level, the start bit of the microprogram shown in FIG. 10 is set to "1" in the last step of the microprogram subroutine, and the start address of the next microprogram subroutine is generated. Thereafter, in the microprogram, the address of the next microprogram is designated so that the sequence is proceeded.

As described above, the start address 105 of the microprogram subroutine is generated by merging the 6-bit data compressed from the 8-bit instruction code 103 and the decode mode flag in the microprogram. Since the 8-bit instruction code has the code scheme shown in FIG. 5, 32 instructions mapped at 55 of FIG. 5 and 28 instructions mapped at 56, that is, a total of 60 instructions need be discriminated in the code scheme. The 60 instructions are encoded into 6-bit information. There are a plurality of instruction code maps as shown in FIGS. 6 to 8. The code maps are discriminated by a decode mode flag (FIG. 10) in the microprogram. Since the process to be executed next is known in the microprogram, it is designated. For example, in FIGS. 6 to 8, in the last microprogram for the execution of one instruction, the subroutine of the microprogram of the operand addressing of the next instruction is called by using the instruction code map of FIG. 6. At the end of the subroutine, the instruction code map which designates the operation of FIG. 7 or 8 is designated. The instruction code map is also designated by the coded decode mode information. Since the instructions are decoded in this manner, it is not necessary to divide the instructions into certain number of fields and provide separate decoders as is done in the prior art instruction decoder.

In the microprogram format shown in FIG. 10, when a high order bit is "1", the low order 6 bits are used to control the indirect registers 11, 12, 13 and 14. The functions of the indirect registers are (1) to reduce the number of micro-steps by common microprogram, and (2) to communicate between microprogram subroutines. The contents of the indirect registers may be updated at each break of the microsubroutines or instructions, and the updating is requested by the 6-bit information described above. The 6-bit information is supplied to the indirect register control logic 6 where it is converted to an input control signal of the indirect register. The output information of the indirect register is not controlled and the input information is outputted as it is.

The indirect register 11 stores a branch condition designated by the instruction code. The branch condition is supplied to the branch control logic 7. As explained in connection with the operation of the branch control logic 7, the signal which controls the branch of the microprogram is generated by using the branch condition and the operation result. Since the branch condition is directly supplied to the branch control logic 7, the microprogram need only instruct the branch in accordance with the branch condition and it is not necessary to prepare different microprograms for each branch condition of the instruction code.

The instruction register 12 is used to designate the operation of the ALU in accordance with the code classification shown in FIG. 11. The microprogram can either directly designate the operation of the ALU such as addition or subtraction or indirectly designate the operation shown in FIG. 11 which is designated by the indirect register 12. For example, if the high order 4 bits of the instruction code are "3" in hexadecimal notation, the indirect designation of the operation is subtraction (SUB). When the operation of the ALU is directly designated by the microprogram, the indirect designation of the operation is disregarded and the operation designated by the microprogram is executed. When the execution of the indirect operation is instructed by the microprogram, the ALU executes the subtraction. Thus, only when the execution of the indirect operation is instructed by the microprogram, the operation corresponding to the code classification of FIG. 11 is executed.

The indirect operations which can be designated by the code classification of FIG. 11 correspond to the mapping of the instruction codes of the operation designation shown in FIGS. 7 and 8. Thus, for the arithmetic operations which are common in the control of data transfer and different in the ALU operation, the microprograms are prepared by using the indirect designation of the operation so that they can use a common subroutine. Accordingly, it is not necessary to prepare different microprograms for each arithmetic operation of the instruction code.

Figure 12:
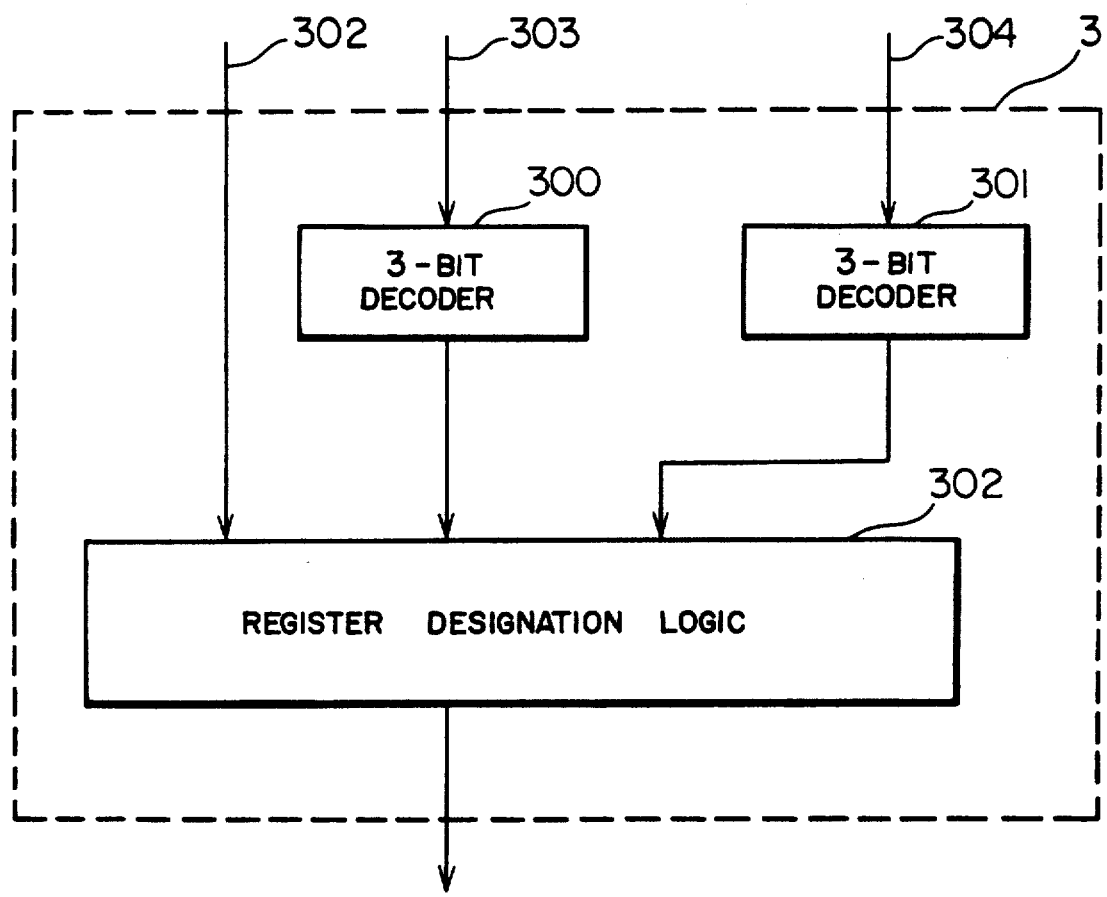
FIG. 12 shows a block diagram of a register control logic.

The indirect registers 13 and 14 are used as input/output designation information for the eight registers 40. The instruction code of the instruction to be executed has a format shown in FIG. 2 and it is supplied sequentially one byte at a time. Thus, without the indirect register, the designation information for the register designated by the instruction code in the addressing mode is lost in the subroutine of the operation. In order to avoid this, the indirect register is used to hold the information. The microprogram can either directly designate the register or designate it in accordance with the information in the indirect registers 13 and 14. A configuration of the register control circuit 3 which generates the control signal for the register input/output is shown in FIG. 12. The output signals 303 and 304 from the indirect registers 13 and 14 are decoded by 3-bit decoders 300 and 301 which indicate the registers to be indirectly designated. The designation information and the information 302 of the microprogram are processed by a register designation logic 302 to generate a signal for controlling the input/output operation of the register 40.

In the microprocessor of the present embodiment, since the instruction code is processed one byte at a time, the instruction may be fetched byte by byte. However, the operation cycle in the LSI is shorter than the memory access cycle. Because of the restriction on the number of pins of the LSI package, parallel communication with a wide bus width with external of the LSI is difficult to attain, but the bus width can be relatively readily widened within the LSI by fine manufacturing process. As a result, the communication between the memory and the microprocessor within the LSI can use the 16-bit data bus and hence it is of high speed. Of the instruction code fetched 16 bits at a time, the high order 8 bits are first used. When the communication with the external of the LSI is effected in the 8-bit width, it is more advantageous from the standpoint of control and the order of use of the instruction code to use the high order data bus 17 for the 8 bits. Matching of the bit positions when operand (data) is externally fetched may be effected by the input/output circuit 402 of the operation circuit.

We claim:

1. A microprogram controlled microprocessor having an instruction for selectively independently setting an operand addressing mode and a type of operation for an operand in one instruction, wherein said instruction outputted from an instruction register is selectively expandable by a unit of predetermined bit length, a first portion of said predetermined bit length code comprising a first instruction code designating said operand addressing, a second portion of said predetermined bit length code comprising a second instruction code designating an operation mode for said operand, said first instruction code and said second instruction code having common coding schemes, comprising:

a combinational logic circuit means for sequentially receiving said first instruction code and then said second instruction code in units of said predetermined bit length and decoding each of the codes by compressing into a shorter bit length with respect to said predetermined bit length thereby comprising an output signal; and means for generating an address of a microprogram by merging the output signal of said combinational logic circuit and at least a portion of bit information of the microprogram.

2. A microprogram controlled microprocessor according to claim 1 wherein said predetermined bit length is 8-bit length.

3. The microprogram controlled microprocessor according to claim 1 wherein the instruction has a form of instruction code including means for designating the addressing mode and the operation simultaneously by said predetermined number of bits.

4. The microprogram controlled microprocessor according to claim 1 wherein a start address of a microprogram subroutine is generated by merging the output signal of said combinational logic circuit and decode mode information of said microprogram outputted from a microprogram storage storing a microprogram.

* * * * *